United States Patent [19]
Wetzel

[11] Patent Number: 5,156,449
[45] Date of Patent: Oct. 20, 1992

[54] HYDRAULIC DUAL-CIRCUIT BRAKE SYSTEM

[75] Inventor: Gerhard Wetzel, Korntal, Fed. Rep. of Germany

[73] Assignee: Robert Bosch GmbH, Stuttgart, Fed. Rep. of Germany

[21] Appl. No.: 622,566

[22] Filed: Dec. 5, 1990

[30] Foreign Application Priority Data

Mar. 31, 1990 [DE] Fed. Rep. of Germany ....... 4010410

[51] Int. Cl.$^5$ .......................... B60T 8/32; B60T 8/44
[52] U.S. Cl. ......................... 303/113 TR; 303/116 R
[58] Field of Search ......... 303/116 P, 116 R, 113 TR, 303/113 R, 113 SS, 119 R, 115 R

[56] References Cited

U.S. PATENT DOCUMENTS

| | | | |
|---|---|---|---|
| 4,627,671 | 12/1986 | Matsui et al. | 303/116 SP |
| 4,715,663 | 12/1987 | Hattori et al. | 303/113 TR X |
| 4,846,532 | 7/1989 | Friedow et al. | 303/113 TR |
| 4,900,102 | 2/1990 | Jonner | 303/113 TR |
| 4,921,313 | 5/1990 | Arikawa | 303/116 R |
| 5,040,852 | 8/1991 | Takata | 303/119 X |

FOREIGN PATENT DOCUMENTS

| | | | |
|---|---|---|---|
| 3337800 | 5/1984 | Fed. Rep. of Germany | 303/113 SS |
| 3816073 | 11/1989 | Fed. Rep. of Germany | |
| 0231256 | 9/1990 | Japan | 303/113 TR |
| 2119883 | 11/1983 | United Kingdom | 303/119 |

Primary Examiner—Matthew C. Graham
Assistant Examiner—Peter M. Poon
Attorney, Agent, or Firm—Edwin E. Greigg; Ronald E. Greigg

[57] ABSTRACT

A hydraulic dual-circuit brake system with an anti-skid system (ABS) and traction control (ASR) for motor vehicles has a four-channel hydraulic unit with control valves and a return pump with two separate pumping elements for each brake circuit. To supply brake pressure in traction control operation, an additional unit is provided having a charging valve for connecting a self-aspirating pumping element of the return pump to the brake fluid tank and a reversing valve disposed in the connection between this pumping element and the master brake cylinder. For a rapid buildup of brake pressure in traction control, given wheel brake cylinders requiring a large brake fluid volume, a reservoir is provided connected to the brake pressure supply circuit by a reservoir connection valve via the reversing valve. Via a check valve between the reservoir and the reservoir connection unit, with a parallel-connected pressure limiting valve, the reservoir is switched off automatically whenever the pressure in the brake pressure supply circuit exceeds the instantaneous reservoir pressure.

20 Claims, 2 Drawing Sheets

HYDRAULIC DUAL-CIRCUIT BRAKE SYSTEM

BACKGROUND OF THE INVENTION

The invention is directed to improvements in a hydraulic dual-circuit brake system provided with an antiskid system and traction control for motor vehicles, in particular passenger vehicles.

In a known dual-circuit brake system of this type (German Patent Document 38 16 073 A) with front-/rear axle or front/rear brake circuit distribution, the return pump has a third pumping element acting as a precharging pump, which is disposed between the charging valve embodied as a hydraulically controlled 2/2-way valve and a pumping element associated with the brake circuit of the driven wheels. The control inlet of the charging valve is connected to the brake circuit outlet of the master brake cylinder. When there is control pressure at the control inlet, the charging valve is switched over to its blocking position. During traction control the reversing valve is reversed and thereupon disconnects the brake circuit from the brake circuit output of the master brake cylinder, and reconnects the brake circuit to the brake circuit outlet of the master brake cylinder via the pressure limiting valve. The third pumping element now supplies the following pumping element of the return pump, which generates a high braking pressure that is present at the inlet to the control valve. This brake pressure is fed via the control valves into the wheel brake cylinders of the driven wheels, which are slowed down as a result. If only one driven wheel is spinning, then the control valve associated with the outlet channel for the wheel brake cylinder of the nonspinning driven wheel is moved to its middle position, so that no brake pressure can be built up in the wheel brake cylinder of the driven wheel that is not spinning.

In dual-circuit brake systems for wheel brake cylinders that require a large volume of brake fluid, care must be taken that rapid brake engagement is achieved at the onset of traction control, by rapidly filling the wheel brake cylinders.

OBJECT AND SUMMARY OF THE INVENTION

It is a principal object of the dual-circuit brake system according to the invention to provide the advantage that in wheel brake cylinders requiring a large volume, the wheel brake cylinder of whichever driven wheel is spinning is very rapidly filled at the beginning of traction control by connection to the filled reservoir, so that rapid contact of the brake shoe is assured. By disposing the parallel circuit of the check valve and the second pressure limiting valve in the connection between the reservoir and the reservoir connection valve, the reservoir is switched off automatically as soon as the pressure in the wheel brake cylinder attains the instantaneous working pressure of the reservoir. This prevents a loss of brake fluid volume by refilling the reservoir during the feeding of brake pressure into the wheel brake cylinder of the spinning driven wheel. Once no further brake fluid volume is received by the wheel brake cylinder (the control valve for the wheel brake cylinder of the spinning wheel is in either its middle, pressure-holding position or its outermost, pressure-reducing position), then the brake supply pressure generated by the self-aspirating pumping element of the return pump attains the opening pressure of the second pressure limiting valve, and the reservoir is charged. Reservoir charging is terminated once the pressure generated by the pumping element exceeds the opening pressure of the first pressure limiting valve. Because of the automatic shutoff of the reservoir when it reaches the instantaneous reservoir pressure in the wheel brake cylinder, the reservoir charging valve can be embodied as a two-way valve, which has considerable advantages, such as a smaller power loss in the electronic control system, compared with an otherwise required three-way valve for switching off the reservoir when the reservoir pressure is attained.

In a preferred embodiment of the invention, the reservoir connection valve is embodied as a 3/2-way magnetic valve with spring restoration; the first valve connection is connected to the reversing valve, the second valve connection is connected to the brake fluid tank, and the third valve connection is connected to the reservoir. The third valve connection of the reservoir connection valve is embodied in such a way that excess pressure in the reservoir, for instance brought about by a temperature change, opens the valve seat, so that the reservoir pressure is reduced by an outflow of fluid into the brake fluid tank. This protects the reservoir against bursting. The opening pressure of the third valve seat can be designed for the same pressure as that of the pressure limiting valve, thus reducing the structural size of the reservoir spring and of the reservoir. The first valve connection is connected to the second valve connection in the unexcited basic position of the 3/2-way magnetic valve, and it is connected to the third valve connection in the working position brought about by magnetic excitation. Thus except for traction control, or in other words whenever the reservoir is disconnected from the outlet of the reversing valve connected to the pressure limiting valve, the reversing valve communicates directly with the brake fluid tank, bypassing the pressure limiting valve. This makes it possible to monitor the reversing valve constantly for leaks. If it leaks, then upon each brake event initiated by brake pedal actuation, brake fluid will flow out of the leaking reversing valve directly into the brake fluid tank. The leak makes itself felt in a brake pedal that can be depressed to the floor.

To assure that the reservoir is under pressure in the event that traction control is necessary, the electronic control system by means of which the reservoir connection valve and the reversing valve, among others, are simultaneously triggered has a switching routine during which, if the brake pedal is unactuated, the reservoir connection valve and the reversing valve are moved for a predetermined period of time to their working position and the return pump is switched on. A brake signal transducer provided on the brake pedal emits a control signal to the electronic control system upon brake pedal actuation and assures that upon braking the charging process of the reservoir is immediately interrupted.

By the disposition of a second reversing valve, identical to the first, in the connection between the other pumping element of the return pump and the other brake circuit outlet of the master brake cylinder, a diagonal brake circuit distribution may be provided instead of a front/rear brake circuit distribution.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
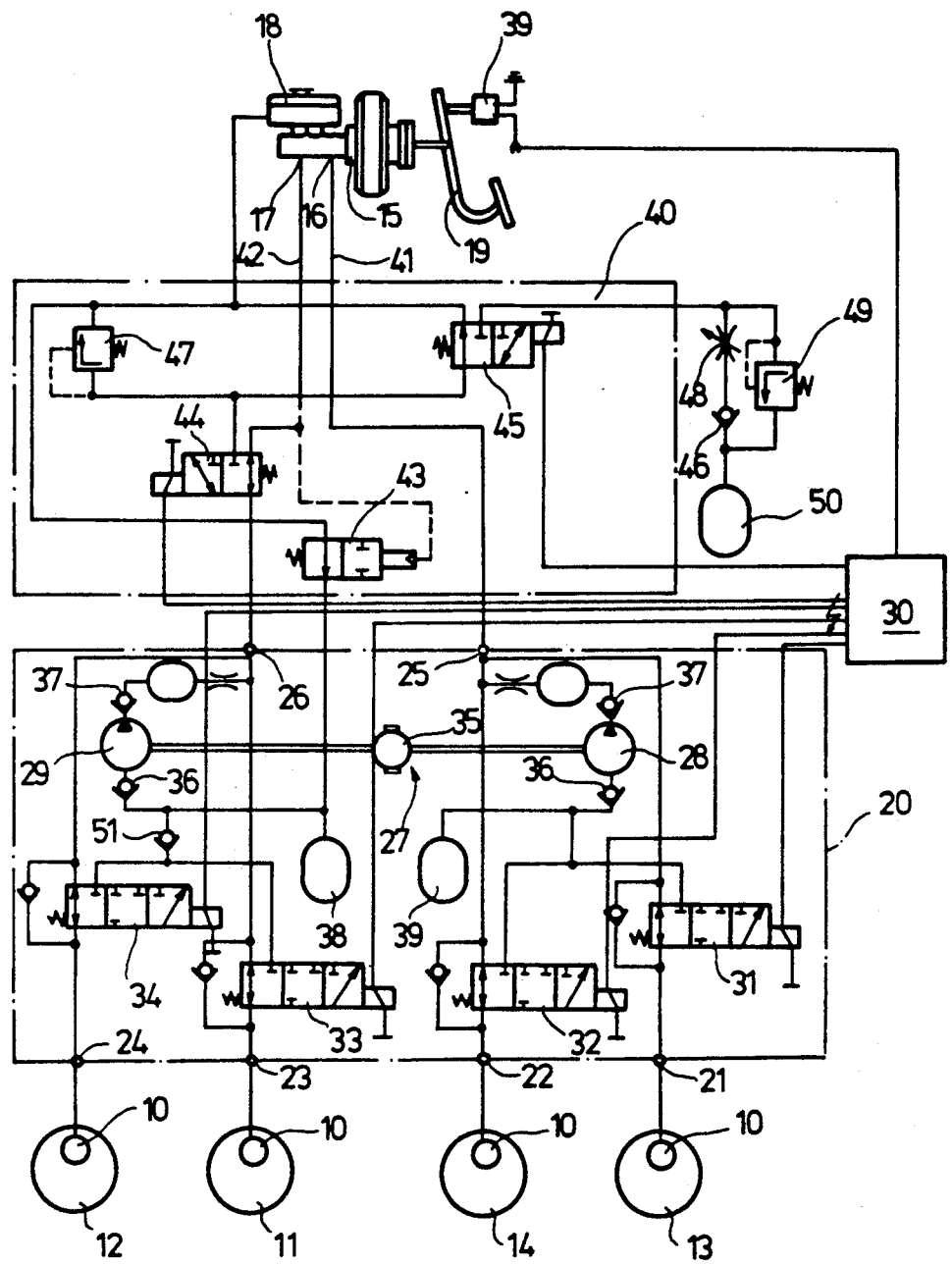
FIG. 1 is a block circuit diagram of a dual-circuit brake system with front/rear brake circuit distribution, an anti-skid system and traction control for a passenger car.

In the hydraulic dual-circuit brake system shown in FIG. 1 in the form of a block circuit diagram and having front/rear, or so-called black/white distribution, an anti-skid system (ABS) and traction control (ASR) for a passenger car, the wheel brake cylinders 10 of the driven wheels 11, 12 are disposed in one brake circuit, and the wheel brake cylinders 10 of the non-driven wheels 13, 14 are disposed in the other brake circuit. The driven wheels 11, 12 are generally the rear wheels of the passenger car. In a manner known per se, the dual-circuit brake system includes a master brake cylinder 15, which has two brake circuit outlets 16, 17 each for connection to one of the two brake circuits, and which communicates with a brake fluid tank 18. Upon actuation of a brake pedal 19, a brake pressure of equal magnitude is fed into the brake circuits via the two brake circuit outlets 16, 17.

The dual-circuit brake system also includes a four-channel hydraulic unit 20, which has four outlet channels 21–24 and two inlet channels 25 and 26. Connected to each outlet channel 21–24 is one wheel brake cylinder 10 of the wheels 11–14. One control valve 31–34, embodied as a 3/3-way magnetic valve with spring restoration, is assigned to each outlet channel 21–24. The control valves 31–34 are controlled by an electronic control system 30 and build up a brake pressure dependent upon wheel spin of a wheel associated with a given wheel brake cylinder 10. A return pump 27, which is a component of the four-channel hydraulic unit 20, has two pumping elements 28, 29, which are driven in common by an electric motor 35. The pumping elements 28, 29 serve to pump brake fluid out of the wheel brake cylinders 10 upon pressure reduction in the brakes. One pumping element 28, 29 each is disposed in each brake circuit and on the inlet side is connected to the third working connection each of the two control valves 31, 32 or 33, 34 associated with the same brake circuit and on the outlet side to an inlet channel 25 or 26 of the four-channel hydraulic unit 20. One check valve 51, with a flow direction toward the pumping element 29, is disposed in the connections between the control valves 33, 34 associated with the wheel brake cylinders 10 of the driven wheels 11, 12 and the pumping element 29. Upstream and downstream of each pumping element 28, 29 are a pump inlet valve 36, 36' and a pump outlet valve 37, 37', respectively. Low-pressure reservoir chambers 38, 39 connected to the pump inlet valve 36, 36' allow a pressure reduction independently of the pump supply quantity and overcome the opening pressure of the pump inlet valve 36,36'.

The control valves 31–34 are connected by their first working connection each to one inlet channel 25 and 26 and with their second working connection to the associated outlet channel 21–24. The control valves 31–34 are embodied in a known manner such that in their first, non-excited basic valve position there is an unhindered passage from the inlet channels 25, 26 to the outlet channels 21–24, as a result of which the brake pressure controlled by the master brake cylinder 15 reaches the wheel brake cylinders 10 of the wheels 11–14. In the second, middle valve position, which is brought about by exciting the control valves 31–34 with half the maximum current, this passage is interrupted, and all the working connections are blocked, so that the brake pressure built up in the wheel brake cylinders 10 is kept constant. In the third, terminal valve position, which is established by valve excitation with maximum current, the outlet channels 21 and 22, and 23 and 24, respectively, and thus the wheel brake cylinders 10 of the wheels 11–14, are connected to the inlet of the pumping elements 28 and 29, respectively, so that to decrease the brake pressure brake fluid can flow out of the wheel brake cylinders 10. The inlet channel 25 of the four-channel hydraulic unit 20 communicates via a first connecting line 41 with the brake circuit outlet 16 of the master brake cylinder 15, and the inlet channel 26 communicates via a second connecting line 42 with the brake circuit outlet 17 of the master brake cylinder 15.

An additional hydraulic unit 40 serves to generate a brake supply pressure in traction control (in the ASR mode). It has a charging valve 43, embodied as a hydraulically controlled 2/2-way valve with spring restoration, and an electromagnetic reversing valve 44. The charging valve 43 communicates by its first valve connection with the outlet of the brake fluid tank 18 and by a second valve connection, via one pump inlet valve 36, to which one low-pressure reservoir chamber 38 is connected, with the self-aspirating pumping element 29 of the return pump 27, while its hydraulic control inlet is connected to the connecting line 42 between the brake circuit outlet 17 from the master brake cylinder 15 and the inlet channel 26 of the four-channel hydraulic unit 20, which is assigned to the brake circuit for the driven wheels 11, 12.

The reversing valve 44 is embodied as a 3/2-way magnetic valve with spring restoration and is disposed in the connecting line 42 between the inlet channel 26 of the four-channel hydraulic unit 20 and the brake circuit outlet 17 of the master brake cylinder 15; the first valve connection is connected to the inlet channel 26, the second valve connection is connected to the brake circuit outlet 17, and the third valve connection is connected via a pressure limiting valve 47 to the brake fluid tank 18. A reservoir 50 is connected, with the interposition of a reservoir connection valve 45, to the third valve connection of the reversing valve 44. The reservoir connection valve 45, embodied as a 3/2-way magnetic valve, connects the third valve connection of the reversing valve 44, in its unexcited basic position, by-passing the pressure limiting valve 47, to the brake fluid tank 18, and in its working position brought about by magnetic excitation to the reservoir 50. To this end, the first valve connection of the reservoir connection valve 45 communicates with the third valve connection of the reversing valve 44; the second valve connection of the reservoir connection valve 45 communicates with the brake fluid tank 18; and the third valve connection communicates with the reservoir 50. The third valve connection is embodied such that in the event of excessive reservoir pressure, for instance from a temperature change, the valve seat opens and fluid can flow to the brake fluid tank 18. This provides protection against bursting. A check valve 46 having a flow direction toward the reservoir connection valve 45 and an adjustable throttle 48 are disposed one after the other in the flow direction in the communication between the third valve connection and the reservoir 50. A second pressure limiting valve 49, the flow direction of which is toward the reservoir 50 and the opening pressure of which is lower than the opening pressure of the first pressure limiting valve 47 located between the third valve connection of the reversing valve 44 and the brake fluid tank 18, is disposed parallel to the series circuit of the check valve 46 and the throttle restriction 48. The reversing valve 44 and the reservoir connection valve 45 are synchronized with one another, and are controlled by the electronic control system 30 such that they each simultaneously assume either their unexcited basic position or their working position brought about by magnetic excitation. A brake signal transducer 39 is provided on the brake pedal 19, and upon actuation of the brake pedal 19 it furnishes a brake signal to the electronic control system 30.

Charging of the reservoir 50 is effected in a switching routine of the electronic control system 30, in which the electronic control system excites both the reversing valve 44 and the reservoir connection valve 45 for a predetermined period of time while the brake pedal 19 is unactuated, and thus moves these valves into their working position, and at the same time the return pump 27 is switched on. Via the reversed reversing valve 44 and the reversed reservoir connection valve 45, the pumping element 29 now pumps fluid under pressure toward the pressure limiting valves 47 and 49. Since the pressure limiting valve 49 has the lower opening pressure, the reservoir 50 is charged. After the reservoir has been charged, the pressure will build-up to a pressure at which the pressure limiting valve 47 opens and the fluid can be pumped back to the brake fluid tank 18. After the period of time has elapsed, the excitation of the reversing valve 44 and reservoir connection valve 45 is withdrawn and they are returned to their initial position. If the brake pedal 19 is actuated during this charging process, then the electronic control system 30 receives a brake signal from the brake signal transducer 39, whereupon it interrupts the charging of the reservoir 50 by returning the reversing valve 44 and the reservoir connection valve 45 to their initial position.

If a loss of traction arises with at least one of the driven wheels 11, 12, this is imparted to the electronic control system 30 via wheel spin sensors or slip sensors, not shown here. The electronic control system causes magnetic excitation of the reversing valve 44 and at the reservoir connection valve 45, thus reversing them, and at the same time switches the return pump 27 on. The reservoir 50 thus feeds brake fluid to the wheel brake cylinders 10 of the driven wheels 11, 12, via the reservoir connection valve 45 and the reversing valve 44 and also via the control valves 33, 34, and very rapidly meets the large-volume that the wheel brake cylinders 10 require for application of the brake shoes. At this time the pressure in the brake system is determined by the initial pressure of the reservoir 50 and the additional volume of the wheel brake cylinder 10 which is connected with the reservoir 50 via control valve 33 and/or 34 and the valves 44 and 45 when the pump reaches this pressure value (Pn) the check valve 46 closes and fluid delivered by the pump element 29 is only used for pressure build up in the wheel brake cylinder 10 of the driven wheels 11 and/or 12. After the pump reaches a second pressure value which is the pressure to open the sequence valve 49, fluid from the pump element 29 is delivered in the wheel brake cylinders 10 of the driven wheels 11 and/or 12 and the reservoir 50 via the open valve 49. Because of the final volume of the reservoir, the pump can deliver enough fluid to fill both, the wheel brake cylinder 10 and the reservoir 50. The maximum pressure is limited by the pressure relief valve 47 which is set at a higher pressure than the pressure required to open the sequence valve 49 so after every ASR-control, the reservoir is already filled! Charging of the reservoir 50 is interrupted as soon as the brake supply pressure exceeds the pressure of the pressure limiting valve 49. Thus the reservoir 50 is charged maximally up to the opening pressure of the pressure limiting valve 49.

The closed-loop ABS control function is known per se and is mentioned here only for the sake of completeness. If the driven wheel 11, for instance, spins then the control valve 34 of the nonspinning driven wheel 12 is moved to the middle valve position, so that the outlet channel 24 is blocked off from the brake fluid volume furnished by the pumping element 29 and reservoir 50. Via the other control valve 33, brake pressure in the wheel brake cylinder 10 of the spinning driven wheel 11 is built up, thus slowing down this wheel. The necessary brake pressure is established by pressure modulation, which is effected by switching of the control valve 33. Via the reversing valve 44, excess brake fluid is either used for refilling the reservoir 50 via the reservoir connection valve 45, or else returns to the brake fluid tank 18 via the pressure limiting valve 47. Toward the end of traction control, once a loss of traction is no longer sensed, the electronic control 30 switches the control valve 33 over into its terminal valve position brought about by maximum current excitation. In this position of the control valve 33, brake fluid is pumped out of the wheel brake cylinder 10 of the driven wheel 11 by the pumping element 29 and returned as described via the reversing valve 44. The brake pressure is reduced again, and the low-pressure reservoir chamber 38 is pumped empty. Next, the control valve 33, the reversing valve 44 and the reservoir connection valve 45 are returned to their basic valve position. If there is a loss of traction of both driven wheels 11, 12, both control valves 33, 34 are switched back and forth between the basic valve position and the middle valve position, for brake pressure modulation.

Upon brake pedal actuation, the charging valve is switched over by the brake pressure in the brake pressure line 42 reaching its control inlet, so that the connection between the brake fluid tank 18 and the pumping element 29 of the return pump 27 is blocked. At the same time, by means of a brake signal furnished by the brake signal transducer 39, any charging of the reservoir 50 that may be occurring is interrupted, and to this end the valves 44, 45, if actuated, are switched back into their basic position.

Figure 2:
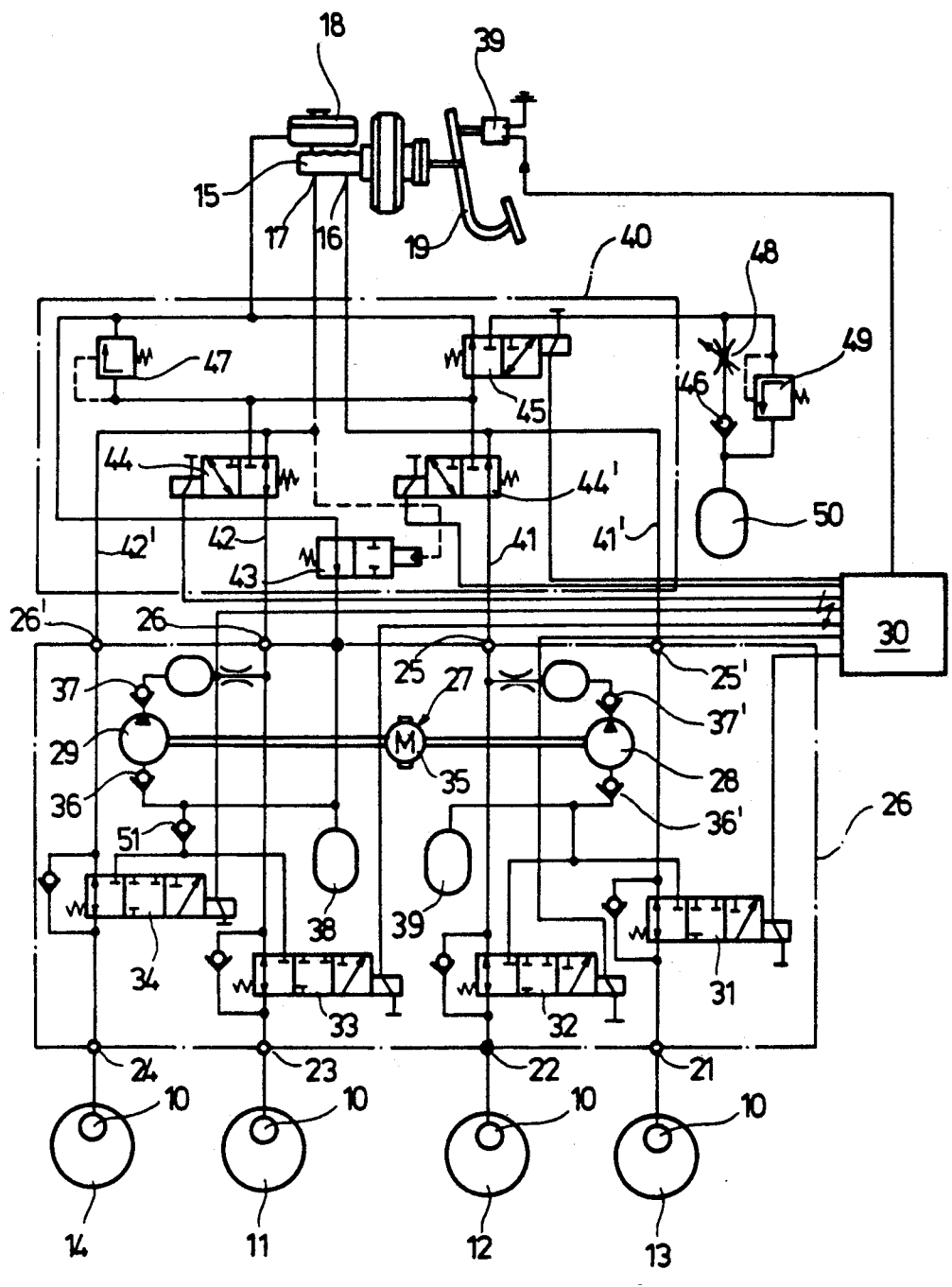
FIG. 2 is a block circuit diagram of a dual-circuit brake system with diagonal brake circuit distribution, an anti-skid system and traction control for a passenger car.

In the hydraulic fuel circuit brake system shown in the form of a block circuit diagram in FIG. 2, having diagonal brake circuit distribution, an anti-skid system (ABS) and traction control (ASR) for passenger oars, one driven wheel 11, 12 is disposed in each of two brake circuits. These driven wheels 11, 12 are in general the front wheels of the passenger car. To the extent that the dual-circuit brake system matches that described in FIG. 1 having front/rear brake circuit distribution, the same components are identified by the same reference numerals. In the four-channel hydraulic unit 20, the two inlet channels 25, 26 are each divided into two channels 25 and 25' and 26 and 26', respectively. As before, the outlets of the pumping elements 28, 29 communicate with the inlet channels 25 and 26, respectively. The control valves 32 and 33, which are assigned to the driven wheels 11, 12 in each brake circuit, are still connected to the inlet side of the inlets 25, 26. The control valves 31, 34 assigned to the non-driven wheels 13, 14 are connected on the inlet side to the inlet channels 25' and 26'. The inlet channels 25' and 26' communicate with the brake circuit outlets 16, 17 of the master brake cylinder 15 through a third and fourth connecting line 41' and 42'. The additional hydraulic unit 40 has a second reversing valve 44' as well, which is embodied identically to the reversing valve 44. This reversing valve 44' is incorporated in the first connecting line 41 between the brake circuit outlet 16 of the master brake cylinder 15 and the inlet channel 25 of the four-channel hydraulic unit 20 in such a way that its first valve connection is connected to the inlet channel 25, its second valve connection is connected to the brake circuit outlet 16, and its third valve connection is connected to the first valve connection of the reservoir connection valve 45. The reversing valve 44' is likewise triggered by the electronic control system 30 simultaneously with the reversing valve 44.

The mode of operation of the dual-circuit brake system is identical to that described in conjunction with FIG. 1.

The invention is not limited to the exemplary embodiments described. For instance, each control valve may be embodied as a combination of two 2/2-way magnetic valves. Then one 2/2-way magnetic valve forms an inlet valve, which in its unexcited basic position makes the unhindered passage from the inlet channel to the associated outlet channel possible and its working position blocks this passage. Conversely, the other 2/2-way magnetic valve, acting as a so-called outlet valve, establishes communication with the associated pumping element in its working position brought about by magnetic excitation, and blocks this passage in its unexcited basic position. In the so-called pressure holding position, both 2/2-way magnetic valves of the valve combination assume their blocking position.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A hydraulic dual-circuit brake system with an anti-skid system and traction control for motor vehicles, in particular passenger cars, comprising a master brake cylinder with first and second separate brake circuit outlets for controlling a brake pressure by brake pedal actuation; a brake fluid tank communicating with the master brake cylinder; a four-channel first hydraulic unit (20) connected to the first and second brake circuit outlets of the master brake cylinder, said four-channel first hydraulic unit having first, second, third and fourth outlet channels for connecting wheel brake cylinders of the vehicle wheels; first, second, third and fourth electromagnetic control valves each associated with one outlet channel for controlling a brake pressure dependent upon wheel slip; a return pump with first and second separate self-aspirating pumping elements (28, 29), said first separate pumping element operative in said first brake circuit and said second separate pumping element is operative in said second brake circuit, for returning brake fluid from the wheel brake cylinders upon brake pressure reduction, said first separate pumping element is connected on an inlet side via said first and second control valves to outlet channels provided for said first brake circuit and on an outlet side to said first separate brake circuit outlet of the master brake cylinder associated with said first separate brake circuit; said second separate pumping element is connected on an inlet side via said third and fourth control valves to outlet channels provided for said second brake circuit and on an outlet side to said second separate brake circuit outlet of the master brake cylinder associated with said second separate brake circuit; a second hydraulic unit (40) for generating a brake supply pressure in traction control, said second hydraulic unit includes a charging valve (43) for connecting said second self-aspirating pumping element (29) of the return pump to the brake fluid tank when a brake pedal is not actuated; a reversing valve (44) disposed in a line connection between said second self-aspirating pumping element of the return pump and said second brake circuit outlet of the master brake cylinder, said reversing valve allowing output of the second pumping element in a first valve position to communicate with the master brake cylinder and in a second valve position to communicate via a first pressure limiting valve (47) with the brake fluid tank; a reservoir (50) that communicates via a reservoir connection valve (45) embodied as a two-way valve with valve connections of the reversing valve (44) and connected to said first pressure limiting valve (47); the reservoir connection valve (45) allowing a communication between the reservoir (50) and the reversing valve (44) to be disconnected in its first valve position and established in its second valve position; a check valve (46) having a flow direction toward the reservoir connection valve (45) disposed in the communication between the reservoir (50) and the reservoir connection valve (45); and connected parallel to the check valve (46) is a second pressure limiting valve (49) having a flow direction toward the reservoir (50) and an opening pressure lower than that of the first pressure limiting valve (47).

2. A system as defined by claim 1, further comprising a variable throttle (48) disposed downstream, in the flow direction, from the check valve (46), and the second pressure limiting valve (49) is connected parallel to a series circuit composed of the check valve (46) and the throttle (48).

3. A system as defined by claim 2, further in which the reservoir connection valve (45) is synchronized with the reversing valve (44) so both valves (44, 45) simultaneously assume their second valve position.

4. A system as defined by claim 2, further in which the reservoir connection valve (45) has three controlled valve connections, of which the first valve connection communicates with the reversing valve (44), the second valve connection communicates with the brake fluid tank (18), and the third valve connection communicates with the reservoir (50); and the first valve connection communicates in the first valve position with the second valve connection and in the second valve position with the third valve connection.

5. A system as defined by claim 2, further in which a second reversing valve (44') disposed in the connection (41) between the other pumping element (28) of the return pump (27) and the other brake circuit outlet (16)

of the master brake cylinder (15), which second reversing valve, in its first valve position, connects the outlet of the other pumping element (28) with the master brake cylinder (15), and in its second valve position connects the outlet of the other pumping element (28) to the brake fluid tank (18), via the first pressure limiting valve (47), on the one hand, and to the reservoir connection valve (45), on the other.

6. A system as defined by claim 2, further in which the reservoir connection valve (45) has a third valve seat embodied to prevent excess reservoir pressure, by an outflow of fluid into the brake fluid tank (18), allowing the opening pressure to become equivalent to that of the first pressure limiting valve (47).

7. A system as defined by claim 1, further in which the reservoir connection valve (45) is synchronized with the reversing valve (44) so both valves (44, 45) simultaneously assume their second valve position.

8. A system as defined by claim 7, further in which the reservoir connection valve (45) has three controlled valve connections, of which the first valve connection communicates with the reversing valve (44), the second valve connection communicates with the brake fluid tank (18), and the third valve connection communicates with the reservoir (50); and the first valve connection communicates in the first valve position with the second valve connection and in the second valve position with the third valve connection.

9. A system as defined by claim 7, further in which a second reversing valve (44') disposed in the connection (41) between the other pumping element (28) of the return pump (27) and the other brake circuit outlet (16) of the master brake cylinder (15), which second reversing valve, in its first valve position, connects the outlet of the other pumping element (28) with the master brake cylinder (15), and in its second valve position connects the outlet of the other pumping element (28) to the brake fluid tank (18), via the first pressure limiting valve (47), on the one hand, and to the reservoir connection valve (45), on the other.

10. A system as defined by claim 7, further in which the reservoir connection valve (45) has a third valve seat embodied to prevent excess reservoir pressure, by an outflow of fluid into the brake fluid tank (18), allowing the opening pressure to become equivalent to that of the first pressure limiting valve (47).

11. A system as defined by claim 1, further in which the reservoir connection valve (45) has three controlled valve connections, of which the first valve connection communicates with the reversing valve (44), the second valve connection communicates with the brake fluid tank (18), and the third valve connection communicates with the reservoir (50); and the first valve connection communicates in the first valve position with the second valve connection and in the second valve position with the third valve connection.

12. A system as defined by claim 11, further in which the reservoir connection valve (45) and the reversing valve (44) each comprise a 3/2-way magnetic valve provided with spring restoration, in the first valve position at least one of said reversing valve and reservoir connection valve being in an unexcited basic position, and the second valve position being in a working position achieved by magnetic excitation.

13. A system as defined by claim 12, further in which the reversing valve (44) and the reservoir connection valve (45) are so controlled by an electronic control system (30) as to move to their working position during the occurrence of a loss of traction of at least one of the driven wheels (11, 12).

14. A system as defined by claim 13, further in which the electronic control system (30) has a switching routine during which, when the brake pedal (19) is not actuated, for a predeterminable period of time the reservoir connection valve (45) and the reversing valve (44) are moved into their working position and the return pump (27) is switched on.

15. A system as defined by claim 14, further in which a brake signal transducer (39) is disposed on the brake pedal (19) and upon brake pedal actuation generates a signal, and the brake signal transducer (39) is connected to the electronic control system (30), which upon the occurrence of a brake signal interrupts the switching routine.

16. A system as defined by claim 14, further in which a second reversing valve (44') disposed in the connection (41) between the other pumping element (28) of the return pump (27) and the other brake circuit outlet (16) of the master brake cylinder (15), which second reversing valve, in its first valve position, connects the outlet of the other pumping element (28) with the master brake cylinder (15), and in its second valve position connects the outlet of the other pumping element (28) to the brake fluid tank (18), via the first pressure limiting valve (47), on the one hand, and to the reservoir connection valve (45), on the other.

17. A system as defined by claim 11, further in which a second reversing valve (44') disposed in the connection (41) between the other pumping element (28) of the return pump (27) and the other brake circuit outlet (16) of the master brake cylinder (15), which second reversing valve, in its first valve position, connects the outlet of the other pumping element (28) with the master brake cylinder (15), and in its second valve position connects the outlet of the other pumping element (28) to the brake fluid tank (18), via the first pressure limiting valve (47), on the one hand, and to the reservoir connection valve (45), on the other.

18. A system as defined by claim 11, further in which the reservoir connection valve (45) has a third valve seat embodied to prevent excess reservoir pressure, by an outflow of fluid into the brake fluid tank (18), allowing the opening pressure to become equivalent to that of the first pressure limiting valve (47).

19. A system as defined by claim 1, further in which a second reversing valve (44') disposed in the connection (41) between the other pumping element (28) of the return pump (27) and the other brake circuit outlet (16) of the master brake cylinder (15), which second reversing valve, in its first valve position, connects the outlet of the other pumping element (28) with the master brake cylinder (15), and in its second valve position connects the outlet of the other pumping element (28) to the brake fluid tank (18), via the first pressure limiting valve (47), on the one hand, and to the reservoir connection valve (45), on the other.

20. A system as defined by claim 1, further in which the reservoir connection valve (45) has a third valve seat embodied to prevent excess reservoir pressure, by an outflow of fluid into the brake fluid tank (18), allowing the opening pressure to become equivalent to that of the first pressure limiting valve (47).

* * * * *